United States Patent
Koshoffer et al.

(10) Patent No.: US 6,981,361 B2
(45) Date of Patent: Jan. 3, 2006

(54) METHODS FOR OPERATING GAS TURBINE ENGINES

(75) Inventors: John Michael Koshoffer, Cincinnati, OH (US); Kevin R. Drake, Cincinnati, OH (US); Lawrence Butler, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 10/890,337

(22) Filed: Jul. 13, 2004

(65) Prior Publication Data

US 2004/0244359 A1 Dec. 9, 2004

Related U.S. Application Data

(62) Division of application No. 10/026,162, filed on Dec. 21, 2001, now Pat. No. 6,868,665.

(51) Int. Cl.
*F02K 3/10* (2006.01)

(52) U.S. Cl. ...................................... 60/204

(58) Field of Classification Search ............... 60/204, 60/226.1, 226.3, 247, 249, 261, 766
See application file for complete search history.

(56) References Cited

U.S. PATENT DOCUMENTS

| | | | | |
|---|---|---|---|---|
| 2,635,420 A | * | 4/1953 | Jonker | 60/247 |
| 2,887,845 A | * | 5/1959 | Hagen | 60/761 |
| 3,161,378 A | * | 12/1964 | Creasey et al. | 60/761 |
| 3,678,692 A | * | 7/1972 | Heise | 60/247 |
| 5,020,318 A | * | 6/1991 | Vdoviak | 60/761 |
| 5,513,489 A | | 5/1996 | Bussing | |
| 5,694,768 A | | 12/1997 | Johnson et al. | |
| 5,778,658 A | | 7/1998 | Lamando, Jr. et al. | |
| 5,873,240 A | | 2/1999 | Bussing et al. | |
| 6,442,930 B1 | | 9/2002 | Johnson et al. | |
| 6,505,462 B2 | | 1/2003 | Meholic | |

FOREIGN PATENT DOCUMENTS

WO CH87/00054 5/1987

* cited by examiner

*Primary Examiner*—Michael Koczo, Jr.
(74) *Attorney, Agent, or Firm*—Armstrong Teasdale LLP; William Scott Andes

(57) ABSTRACT

A method facilitates generating thrust from a gas turbine engine using a pulse detonation system. The method includes introducing fuel and air to the engine, mixing fuel and air in a pulse detonation system deflagration chamber positioned radially outward from an engine exhaust centerbody, and detonating the fuel and air mixture within the pulse detonation system to facilitate increasing the temperature and pressure within the engine and to generate engine thrust.

5 Claims, 4 Drawing Sheets

METHODS FOR OPERATING GAS TURBINE ENGINES

CROSS REFERENCE TO RELATED APPLICATIONS

This application is a divisional of U.S. application Ser. No. 10/026,162, filed Dec. 21, 2001, now U.S. Pat. No. 6,868,665, which is hereby incorporated by reference.

BACKGROUND OF THE INVENTION

This invention relates generally to gas turbine engines and more particularly, to a pulse detonation system for a turbofan engine.

Variable cycle turbofan ramjet engines may be used to provide aircraft flight-speeds between low subsonic Mach numbers to high supersonic Mach numbers of about Mach 6. Known engines, as described in U.S. Pat. No. 5,694,768, include a core engine system and a dual mode augmentor. The dual mode augmentor provides additional heat to exhaust airflow exiting the core engine system to increase engine thrust. The core engine system provides power to drive a fan assembly and typically includes in serial, axial flow relationship, a compressor, a combustor, a high pressure turbine, and a low pressure turbine. The dual mode augmentor is positioned downstream from the core engine and receives air from the core engine and a bypass duct surrounding the core engine.

Known engines can operate over a wide range of flight speed operations if several different combustion systems are utilized. During flight speed operations from take-off to approximately Mach 3, the core engine and an engine fan system provide airflow at a pressure and quantity used by the augmentor to produce thrust for the engine. However, augmentor performance may be limited by the constraints of existing engine components. More specifically, at least some known engines include a conventional bluff centerbody that extends aftward from the core engine and enables the engine to achieve pressure ratios necessary for engine operations.

BRIEF SUMMARY OF THE INVENTION

In one aspect, a method for generating thrust from a gas turbine engine using a pulse detonation system is provided. The method comprises introducing fuel and air to the engine, mixing fuel and air in a pulse detonation system deflagration chamber positioned radially outward from an engine exhaust centerbody, and detonating the fuel and air mixture within the pulse detonation system to facilitate increasing the temperature and pressure within the engine and to generate engine thrust.

In another aspect of the invention, a pulse detonation system for a gas turbine engine is provided. The pulse detonation system is configured to create a temperature rise and a pressure rise within the gas turbine engine and to increase gas turbine engine thrust. The pulse detonation system includes at least one deflagration chamber radially outward from an engine exhaust centerbody.

In a further aspect, a gas turbine engine is provided. The gas turbine engine includes an inlet portion, an exhaust portion, a centerline axis of symmetry, an exhaust centerbody, and a pulse detonation system. The exhaust portion is positioned co-axially with the inlet portion. The exhaust centerbody is concentrically aligned with the exhaust portion and extends axially along the centerline axis of symmetry into the exhaust portion. The pulse detonation system is positioned between the engine inlet portion and the engine exhaust portion, and is configured to create a temperature rise and a pressure rise within said engine and to increase engine thrust. The pulse detonation system includes at least one deflagration chamber that is radially outward from the engine exhaust centerbody.

BRIEF DESCRIPTION OF THE DRAWINGS

FIG. 1 is a cross-sectional side view of a gas turbine turbofan engine 10 including a pulse detonation system 12 in a first mode of engine operation. FIG. 2 is an enlarged partial cross-sectional side view of engine 10 in a second mode of engine operation. In one embodiment, engine 10 is an F110 engine and is available from General Electric Aircraft Engines, Cincinnati, Ohio. Engine 10 has a generally longitudinally extending axis or centerline 14 extending from an inlet end 16 of engine 10 aftward to an exhaust end 18 of engine 10. Engine 10 includes a core engine 30 which includes a high pressure compressor 34, a combustor 36, a high pressure turbine 38, and a power turbine or a low pressure turbine 40, all arranged in a serial, axial flow relationship. Engine 10 also includes a bypass duct 42 surrounding the core engine 30. In alternative embodiments, engine 10 also includes a core fan assembly.

Figure 1:
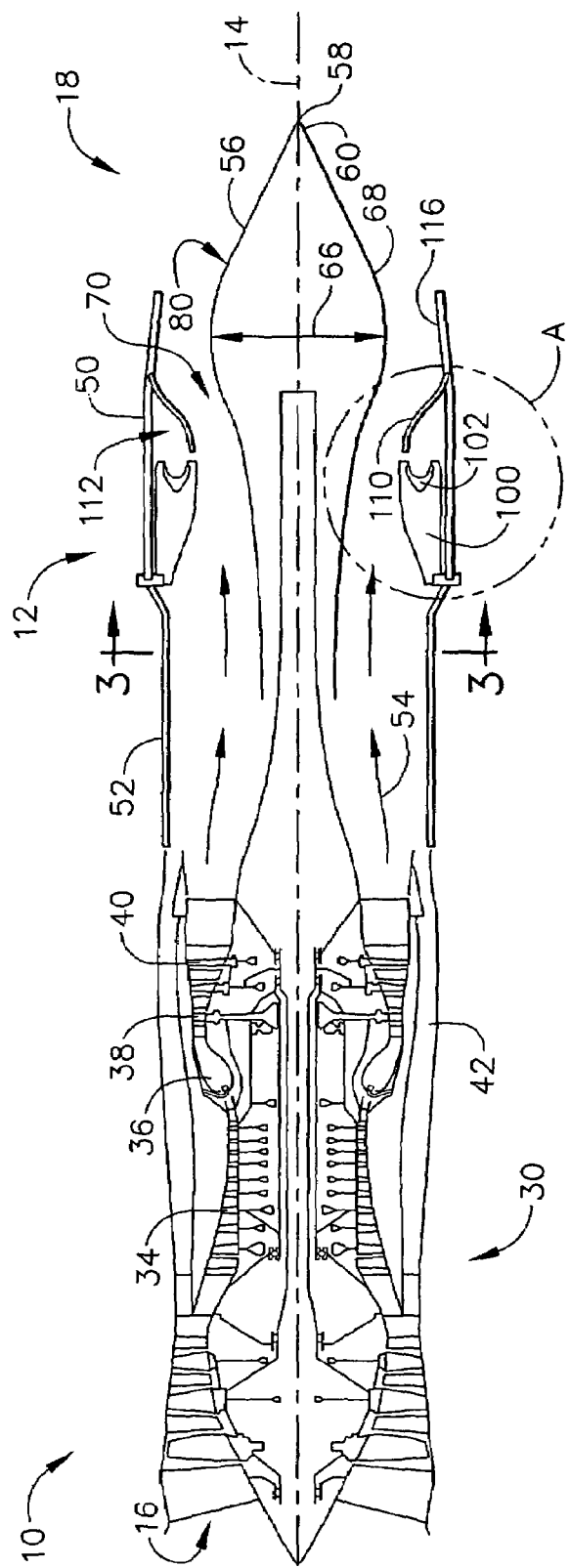
FIG. 1 is a cross-sectional side view of a gas turbine engine including a pulse detonation system in a first mode of engine operation.

An exhaust nozzle 50 extends aftward from core engine 30 and includes a nozzle portion 52. Nozzle portion 52 extends between nozzle 50 and core engine 30 and defines a portion of an outer boundary of an engine exhaust flowpath 54. More specifically, nozzle portion 52 directs combustion gases discharged from core engine 30 and airflow exiting bypass duct 42 downstream through exhaust nozzle 50.

A bluff body or centerbody 56 extends aftward from core engine 30 to an apex 58 formed at an aft end 60 of centerbody 56. More specifically, centerbody 56 is concentrically aligned with respect to nozzle 50 and extends aftward along engine centerline 14. Centerbody 56 is contoured and has a variable width 66 measured axially along centerbody 56 such that centerbody 56 defines a convergent-divergent path through nozzle 50. Accordingly, an outer surface 68 of centerbody 56 defines an inner boundary of engine exhaust flowpath 54. More specifically, a nozzle throat area 70 is defined between centerbody outer surface 68 and nozzle 50.

Figure 2:
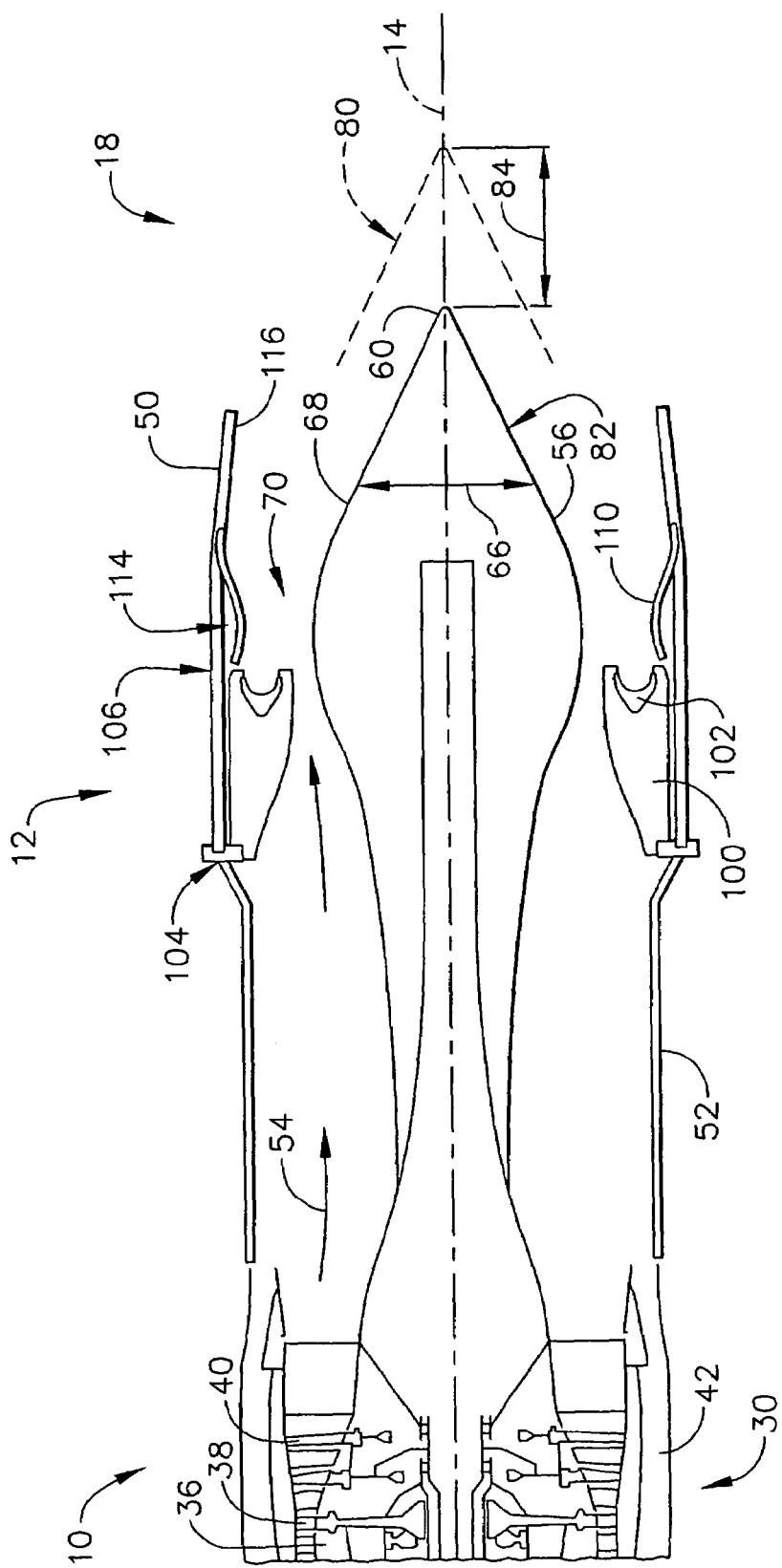
FIG. 2 is an enlarged partial cross-sectional side view the engine shown in FIG. 1 in a second mode of engine operation.

Centerbody 56 is axially translatable between a first position 80 and a second position 82 depending upon a mode of engine operation of engine 10. More specifically, when engine 10 is in a first mode of operation, also known as a dry mode of operation, centerbody 56 is positioned at an aft first position 80, as illustrated in FIG. 1. When engine 10 is in a second mode of operation, known as a reheat or augmented mode of operation, centerbody 56 is positioned at a forward second position 82, as illustrated in FIG. 2. More specifically, centerbody 56 is moveable a distance 84 between aft first position 80 and upstream second position 82.

Pulse detonation system 12 is disposed downstream from core engine 30 and receives core engine combustion gases discharged from core engine 30 and airflow exiting bypass duct 42. System 12 is known as a two-stage detonation augmentor, and creates a temperature rise and a pressure rise within engine 10 without the use of turbomachinery included within core engine 30 to generate thrust from engine 10. Specifically, pulse detonation system 12 includes a hollow deflagration chamber 100 and a hollow detonation chamber 102 that facilitate increasing the performance and operating range of engine 10.

Deflagration chamber 100 is contoured and is positioned radially outwardly from centerbody 56 in flow communication with core engine 30. Thus, because chamber 100 extends into flowpath 54, the contour of chamber 100 directs the flow of core engine combustion gases discharged from core engine 30 and airflow exiting bypass duct 42. Furthermore, because of the contour of chamber 100, an upstream end 104 of deflagration chamber 100 is positioned a farther distance from centerbody 56 than a downstream end 106 of deflagration chamber 100. In the exemplary embodiment, deflagration chamber 100 is annular and extends circumferentially around centerbody 56 within engine nozzle 50. In an alternative embodiment, deflagration chamber 100 is non-annular and engine 10 includes a plurality of deflagration chambers 100 extending axi-symmetrically and circumferentially around centerbody 56 within engine nozzle 50. Deflagration chamber 100 is coupled in flow communication with a fuel source (not shown) and an air source (not shown) used for atomization.

Detonation chamber 102 is positioned at deflagration chamber downstream end 106 in flow communication with deflagration chamber 100, such that flow exiting deflagration chamber 100 is discharged through detonation chamber 102. More specifically, deflagration chamber 100 includes a vaneless radial nozzle (not shown) that accelerates and directs flow from chamber 100 into detonation chamber 102. Detonation chamber 102 is in serial, axial flow relationship with deflagration chamber 100. Detonation chamber 102 is also in flow communication with a reversed flap 110 positioned downstream from chambers 100 and 102.

Flap 110 is translatable between a first position 112 and a second position 114 depending upon a mode of engine operation. More specifically, flap 110 translates to first position 112 during dry mode of engine operation, and second position 114 during reheat mode of engine operation. Flap 110 is contoured and when in a first position 112, flap 110 extends radially inwardly from an inner surface 116 of nozzle 50 towards an inner surface 120 of deflagration chamber 100. More specifically, when flap 110 is in first position 112, the contour of flap 110 substantially mirrors the contour of centerbody 56. Accordingly, engine combustion gases discharged from core engine 30 and flowing past deflagration chamber 100 along flowpath 54 are channeled downstream between flap 110 and centerbody 56.

When flap 110 is in first position 112, flap 110 facilitates preventing airflow from backflowing to contact detonation chamber 102, and thus, essentially prevents flow communication between detonation chamber 102 and engine flowpath 54. Alternatively, when flap 110 is in second position 114, flap 110 is considered "stowed" in close proximity to nozzle inner surface 116, and thus, detonation chamber 100 is returned to flow communication with flowpath 54 and pulse detonation system 12 receives combustion gases discharged from core engine 30 and airflow exiting bypass duct 42.

During operation, engine 10 is initially operated in a dry mode of operation, and no fuel is supplied to pulse detonation system 12, or more specifically, no fuel is supplied to deflagration chamber 100. During the dry mode of engine operation, reversed flap 110 is positioned at first position 112, and facilitates directing flow passing deflagration chamber 100 downstream along flowpath 54. Furthermore, during the dry mode of engine operation, centerbody 56 is positioned in aft first position 80, and combustion gases discharged from core engine 30 and airflow exiting fan bypass duct 42 flow through the convergent-divergent path defined between centerbody 56 and nozzle 50. During the dry mode of engine operation, axial movements of centerbody 56 provide throat area modulation.

In the augmented or reheat mode of engine operation, flap 110 is translated to second position 114, or the stowed position, and detonation chamber 102 is returned to flow communication with flowpath 54. Fuel is supplied to deflagration chamber 100 such that chamber 100 is operated in a fuel-rich mode of operation. Flow exiting deflagration chamber 100 enters detonation chamber 102 through the vaneless radial nozzle which operates above a critical pressure ratio, and combustion is initiated within detonation chamber 102. Because centerbody 56 is translated to second position 82 during the reheat mode of engine operation, the pressure ratio across the vaneless radial nozzle is increased. When this pressure ratio reaches the critical value, detonation occurs within detonation chamber 102. The resulting detonation shock pattern results in the temporary interruption of flow into chamber 102, the discharge of detonation products aftwards, and the initiation of a fresh charge of deflagration products through the radial nozzle. The cycle is repeated at a high frequency such that an amount of thrust from engine 10 is increased without impacting operation of core engine 30. As a result, operation of pulse detonation system 12 creates a pressure and temperature rise within engine 10, which facilitates increasing an amount of thrust from engine 10.

Figure 3:
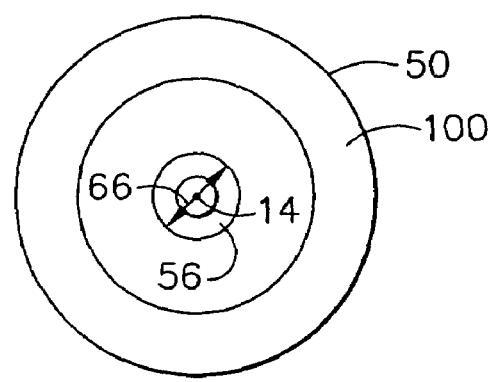
FIG. 3 is a cross sectional view of an exemplary embodiment of the deflagration chamber taken along lines 3—3 shown in FIG. 1.

FIG. 3 is a cross sectional view of an exemplary embodiment of deflagration chamber 100 taken along lines 3—3 shown in FIG. 1. The cross-sectional view represents a view taken from core engine 30 (shown in FIG. 1) towards exhaust nozzle 50. Centerbody 56 extends aftward from core engine 30 and is substantially concentrically aligned with respect to nozzle 50 along engine centerline 14. Centerbody 56 is contoured and has a variable width 66 measured axially along centerbody 56. Deflagration chamber 100 is contoured and is positioned radially outwardly from centerbody 56 in flow communication with core engine 30. In the exemplary embodiment, deflagration chamber 100 is annular and extends circumferentially around centerbody 56 within engine nozzle 50.

Figure 4:
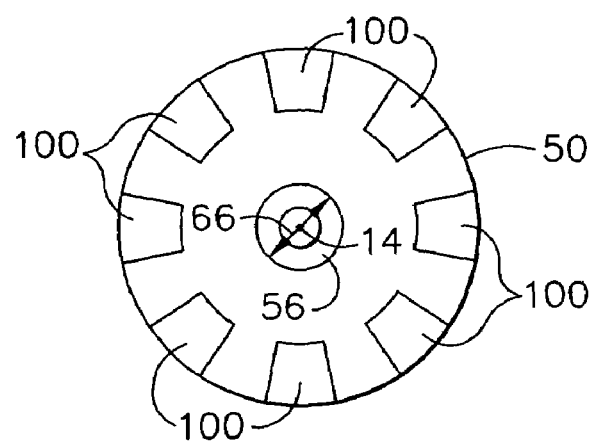
FIG. 4 is a cross sectional view of an alternative embodiment of the deflagration chambers taken along lines 3—3 shown in FIG. 1.

FIG. 4 is a cross sectional view of an alternative embodiment of the deflagration chambers taken along lines 3—3 shown in FIG. 1. The cross-sectional view represents a view taken from core engine 30 (shown in FIG. 1) towards exhaust nozzle 50. Centerbody 56 extends aftward from core engine 30 and is concentrically aligned with respect to nozzle 50 and extends aftward along engine centerline 14. Centerbody 56 is contoured and has a variable width 66 measured axially along centerbody 56. In this embodiment, deflagration chamber 100 is non-annular and engine 10 includes a plurality of deflagration chambers 100 extending axi-symmetrically and circumferentially around centerbody 56 within engine nozzle 50. Deflagration chamber 100 is coupled in flow communication with the fuel source (not shown) and the air source (not shown) used for atomization.

Figure 5:
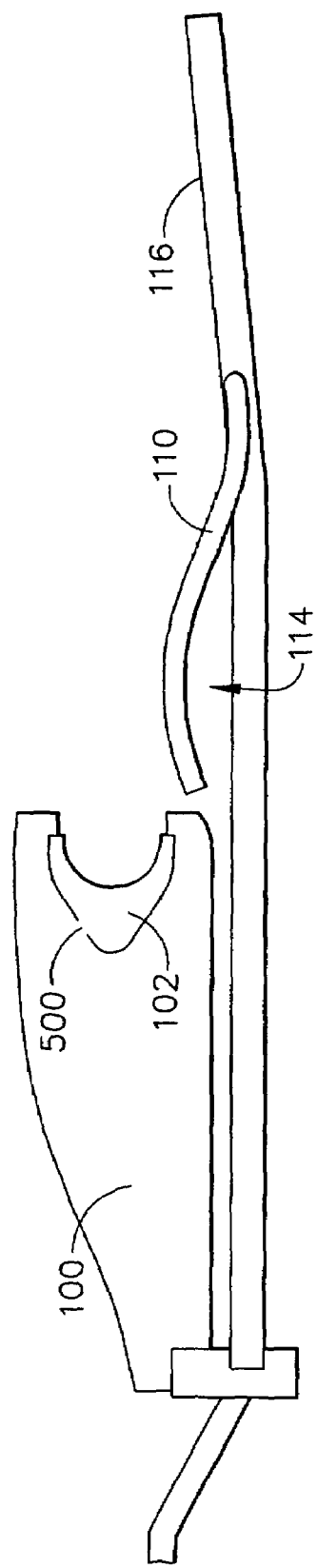
FIG. 5 is a detailed view of the exemplary two-stage pulse detonation system shown in area A of FIG. 1.

FIG. 5 is a detailed view of the exemplary two-stage pulse detonation system shown in area A of FIG. 1. Detonation chamber 102 is positioned at deflagration chamber downstream end 106 in flow communication with deflagration chamber 100, such that flow exiting deflagration chamber 100 is discharged through detonation chamber 102. More specifically, deflagration chamber 100 includes a vaneless radial nozzle 500 that accelerates and directs flow from chamber 100 into detonation chamber 102. In the augmented or reheat mode of engine operation, flap 110 is translated to second position 114, or the stowed position, and detonation chamber 102 is returned to flow communication with flowpath 54, which includes combustion gases discharged from core engine 30 and airflow exiting bypass duct 42. Fuel is supplied to deflagration chamber 100 such that chamber 100 is operated in a fuel-rich mode of operation. Flow exiting deflagration chamber 100 enters detonation chamber 102 through vaneless radial nozzle 500, which based on inlet, outlet, and throat dimensions, and upstream and downstream pressures, operates above the critical pressure ratio, and combustion is initiated within detonation chamber 102. Because centerbody 56 is translated to second position 82 during the reheat mode of engine operation, the pressure ratio across the vaneless radial nozzle is increased. When this pressure ratio reaches the critical value, detonation occurs within detonation chamber 102. The resulting detonation shock pattern results in the temporary interruption of flow into chamber 102, the discharge of detonation products aftwards, and the initiation of a fresh charge of deflagration products through the radial nozzle. The cycle is repeated at a high frequency during operation in the augmented mode.

The above-described pulse detonation system includes at least one deflagration chamber in serial, axial-flow with a detonation augmentor which produces engine thrust without the use of turbomachinery. As a result, engines using the pulse detonation system obtain increased thrust over baseline engines operating without the pulse detonation system. As a result, a pulse detonation system is provided which permits an engine to operate with a high efficiency and thus facilitates increasing performance over a wide range of operating flight speeds.

While the invention has been described in terms of various specific embodiments, those skilled in the art will recognize that the invention can be practiced with modification within the spirit and scope of the claims.

What is claimed is:

1. A method for generating thrust from a gas turbine engine using a pulse detonation system, wherein the engine includes a core engine, said method comprising:
   introducing fuel and air to the engine;
   mixing fuel and air in a pulse detonation system deflagration chamber positioned radially outward from an engine exhaust centerbody by supplying fuel and air to the deflagration chamber downstream from the core engine such that the chamber is operated in a fuel-rich mode; and
   detonating the fuel and air mixture within the pulse detonation system to facilitate increasing the temperature and pressure within the engine and to generate engine thrust.

2. A method in accordance with claim 1 wherein mixing fuel and air in a pulse detonation system deflagration chamber further comprises:
   accelerating the fuel-air mixture from the deflagration chamber to a detonation chamber downstream from the deflagration chamber.

3. A method in accordance with claim 2 wherein accelerating the fuel-air mixture further comprises translating a reverse flap that is downstream from the detonation chamber from a first position during a first mode of engine operation to a second position during a second mode of engine operation.

4. A method in accordance with claim 1 wherein mixing fuel and air in a pulse detonation system deflagration chamber further comprises mixing fuel and air in a pulse detonation system deflagration chamber that extends circumferentially around the exhaust centerbody.

5. A method in accordance with claim 1 further comprising:
   positioning the centerbody in a first position during a first mode of engine operation; and
   translating the centerbody axially upstream to a second position during a second mode of engine operation.

* * * * *